United States Patent
Rahman et al.

(10) Patent No.: US 9,037,149 B2
(45) Date of Patent: *May 19, 2015

(54) DYNAMIC BANDWIDTH AND ACCESS MANAGEMENT

(71) Applicant: AT&T Intellectual Property I, L.P., Atlanta, GA (US)

(72) Inventors: Moshiur Rahman, Marlboro, NJ (US); Fred Delaplace, Bothell, WA (US)

(73) Assignee: AT&T INTELLECTUAL PROPERTY I, L.P., Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/874,123

(22) Filed: Apr. 30, 2013

(65) Prior Publication Data

US 2013/0237237 A1    Sep. 12, 2013

Related U.S. Application Data

(63) Continuation of application No. 12/939,250, filed on Nov. 4, 2010, now Pat. No. 8,452,302.

(51) Int. Cl.
| | |
|---|---|
| *H04W 72/00* | (2009.01) |
| *H04W 72/08* | (2009.01) |
| *H04W 28/16* | (2009.01) |
| *H04W 84/06* | (2009.01) |

(52) U.S. Cl.
CPC ............ *H04W 72/085* (2013.01); *H04W 84/06* (2013.01); *H04W 28/16* (2013.01)

(58) Field of Classification Search
CPC ... H04W 84/045; H04W 88/08; H04W 48/20; H04W 48/02; H04W 64/00; H04W 72/0426; H04W 28/08; H04W 36/04; H04W 52/244; H04W 72/085; H04W 28/048; H04W 48/06
USPC .......... 455/452.1–452.2, 517, 507, 500, 453, 455/454, 456; 370/328, 338
See application file for complete search history.

(56) References Cited

U.S. PATENT DOCUMENTS

| | | | |
|---|---|---|---|
| 6,978,144 B1 | 12/2005 | Choksi | |
| 7,065,321 B2 | 6/2006 | Lim | |
| 7,286,471 B2 | 10/2007 | Kloth et al. | |
| 7,822,064 B2* | 10/2010 | Thubert et al. | 370/468 |
| 7,840,692 B1 | 11/2010 | Monga et al. | |
| 7,894,470 B2 | 2/2011 | Ruckart | |
| 7,924,793 B2* | 4/2011 | Savoor et al. | 370/338 |
| 8,452,302 B2* | 5/2013 | Rahman et al. | 455/452.2 |
| 2002/0133589 A1 | 9/2002 | Gubbi et al. | |
| 2004/0001467 A1* | 1/2004 | Cromer et al. | 370/338 |
| 2004/0008726 A1 | 1/2004 | Kelly et al. | |
| 2005/0259684 A1 | 11/2005 | Csapo | |
| 2006/0105711 A1* | 5/2006 | Stadelmeier et al. | 455/41.2 |

(Continued)

*Primary Examiner* — Nay A Maung
*Assistant Examiner* — Angelica M Perez
(74) *Attorney, Agent, or Firm* — Toler Law Group, PC

(57) ABSTRACT

A method includes, in response to determining that a data communication measure for a plurality of mobile devices served by a base station exceeds a first data communication threshold for a first data communication path between the base station and a network providing data for the plurality of mobile devices, establishing, at the base station, a second data communication path between the base station and the network via a wireless access point based on an access control list. The method includes receiving, at the base station, a portion of the data from the network via the second data communication path.

20 Claims, 9 Drawing Sheets

(56) References Cited

U.S. PATENT DOCUMENTS

| | | |
|---|---|---|
| 2007/0280289 A1 | 12/2007 | Konda |
| 2008/0062988 A1 | 3/2008 | Daigle |
| 2009/0122707 A1* | 5/2009 | Weinman ................... 370/237 |
| 2012/0115528 A1 | 5/2012 | Rahman et al. |
| 2012/0163224 A1 | 6/2012 | Long |

* cited by examiner

US 9,037,149 B2

DYNAMIC BANDWIDTH AND ACCESS MANAGEMENT

CLAIM OF PRIORITY

The present application is a continuation of and claims priority from U.S. patent application Ser. No. 12/939,250 filed on Nov. 4, 2010, and entitled "DYNAMIC BANDWIDTH AND ACCESS MANAGEMENT," the contents of which are expressly incorporated herein by reference in their entirety.

BACKGROUND

1. Technical Field

This disclosure relates generally to the field of managing bandwidth and quality of service to multiple wireless devices accessing a network, and, more specifically, this disclosure pertains to the field of dynamically providing improved uplink and/or downlink data rates in an on-demand fashion.

2. Description of the Related Art

Mobile devices are used in a variety of locations where wireless access of a network can be available to the mobile devices. In one example, wireless access of the Internet, via a base transceiver station, can be available to multiple mobile devices. In the past, an amount of data that the base transceiver station could communicate with the multiple mobile devices was limited by the one or more wired connections that coupled the base transceiver station to the Internet.

BRIEF DESCRIPTION OF THE DRAWINGS

The preferred embodiments will become apparent upon reading the following detailed description and upon reference to the accompanying drawings in which.

Figure 1:
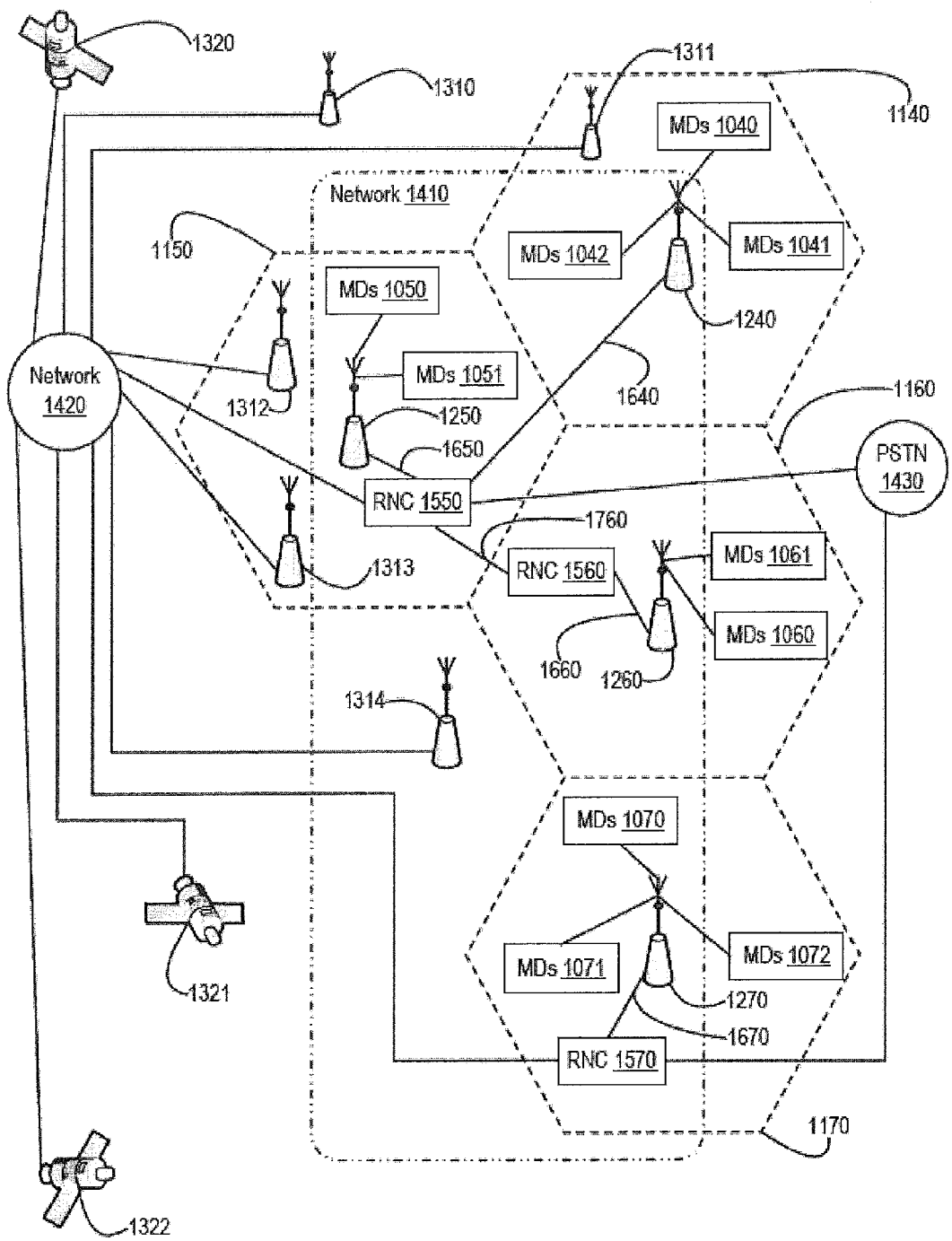
FIGS. 1-3 illustrate block diagrams of one or more network communication systems, according to one or more embodiments.

While the disclosure is susceptible to various modifications and alternative forms, specific embodiments thereof are shown by way of example in the drawings and will herein be described in detail. It should be understood, however, that the drawings and detailed description thereto are not intended to limit the disclosure to the particular form disclosed, but on the contrary, the disclosure is to cover all modifications, equivalents and alternatives falling within the scope of the claims.

DETAILED DESCRIPTION

Figure 2:
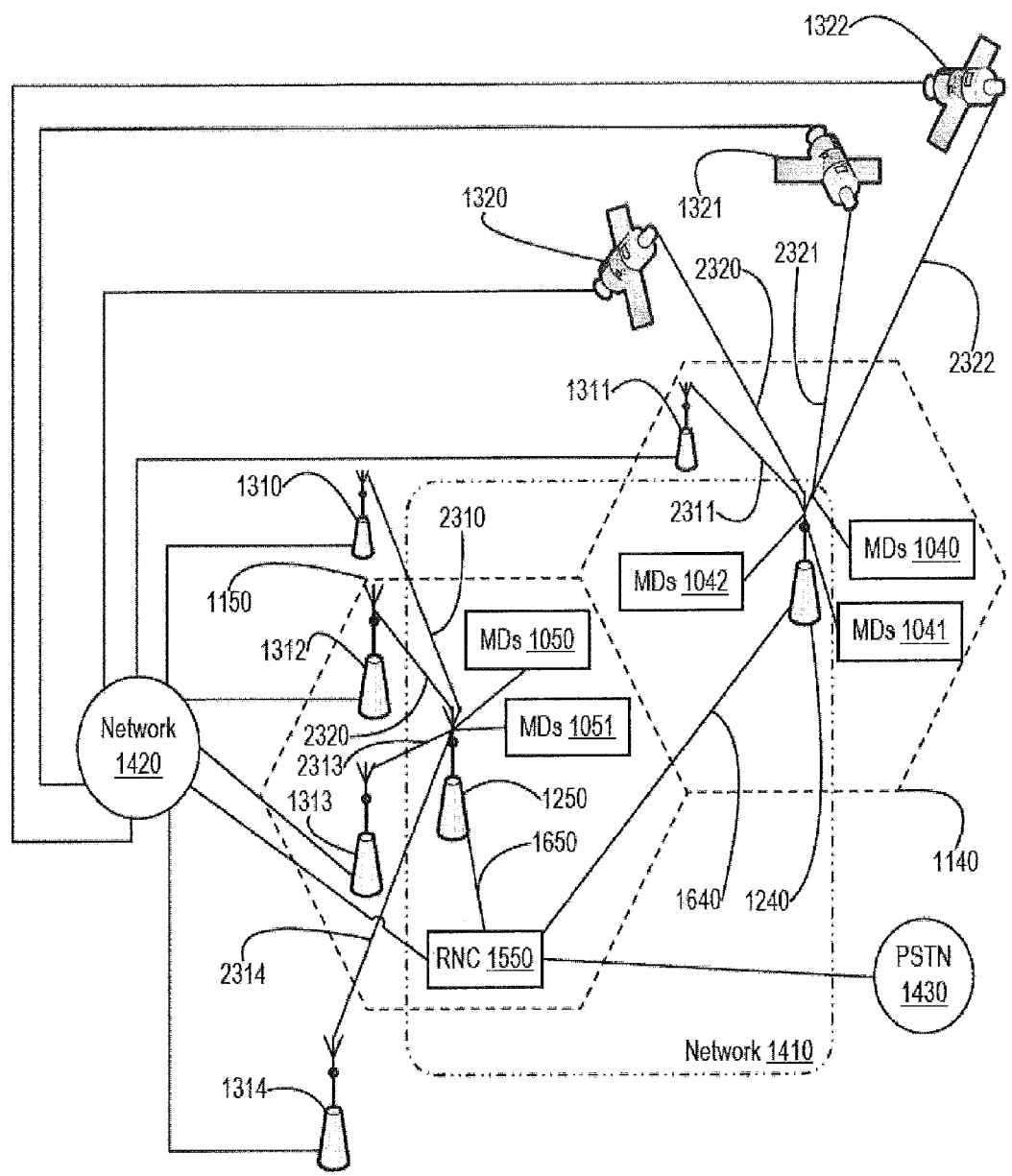
Figure 3:
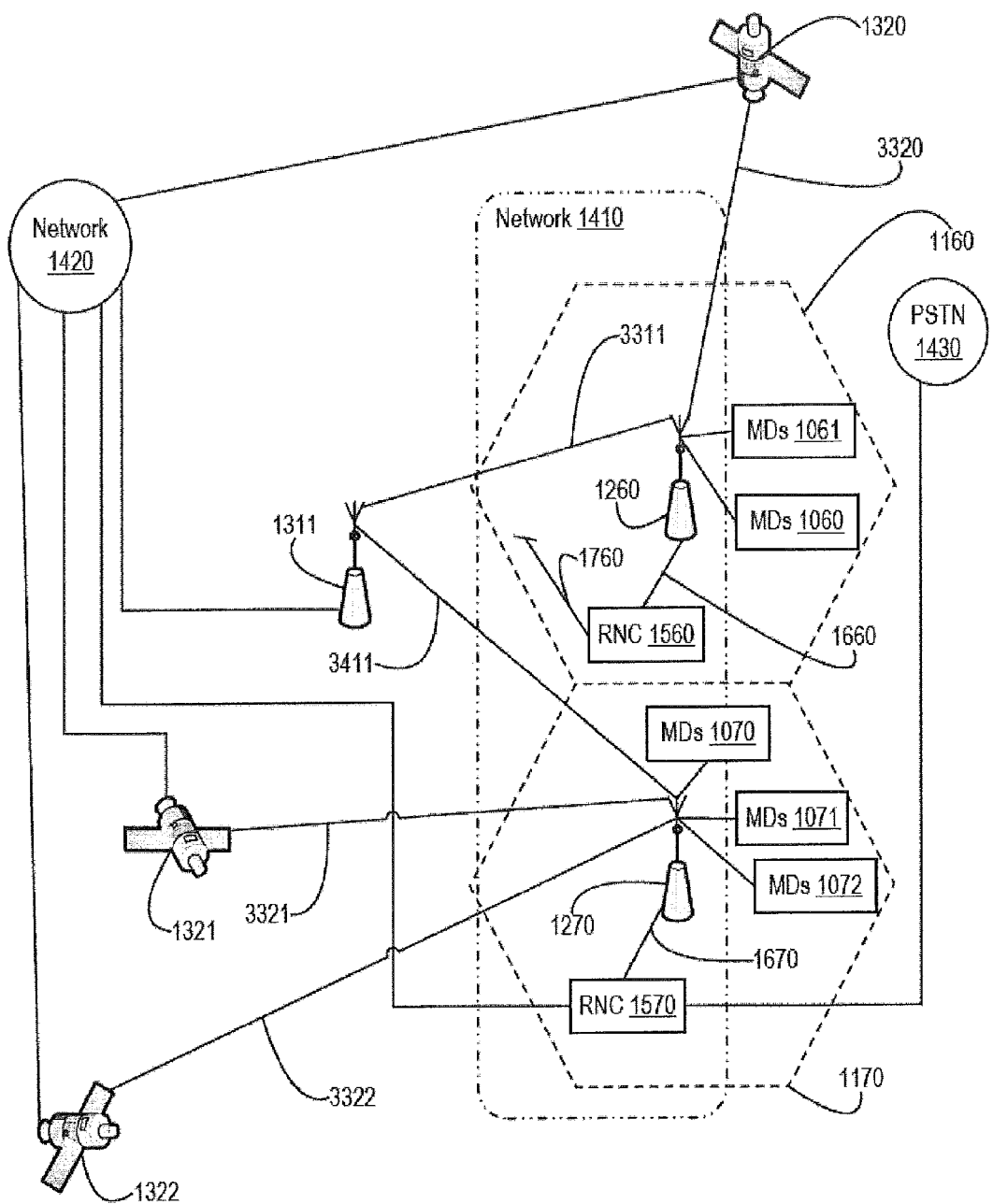

FIGS. 1-3 illustrate block diagrams of one or more network communications systems, according to one or more embodiments. As shown in FIG. 1, one or more base transceiver stations (BTSes) or node Bs (NBs) 1240-1270 can provide wireless data communications services to mobile devices (MDs) 1040-1072 in respective one or more coverage areas 1140-1170. As illustrated, MDs 1040-1042 can be wirelessly coupled to node B (NB) 1240, MDs 1050 and 1051 can be wirelessly coupled to NB 1250, MDs 1060 and 1061 can be wirelessly coupled to NB 1260, and MDs 1070-1072 can be wirelessly coupled to NB 1270.

As shown, NBs 1240 and 1250 can be coupled to a radio network controller (RNC) 1550 via respective data communication paths 1640 and 1650. In one or more embodiments, a data communication path coupling a RNC to a NB, such as data communication path 1640, can be referred to as an Iub interface. In one or more embodiments, a data communication path that couples a NB to a RNC can include one or more wired connections. In one example, the data communication path that couples the NB to the RNC can include one or more of metallic cables and fiber optic cables that can respectively convey electromagnetic signals and optical signals. In one example, the data communication path that couples the NB to the RNC can include one or more of a T1, an E1, a T3, an E3, an OC-3, and an OC-12, among others. As shown, NB 1270 can be coupled to a RNC 1570, and NB 1260 can be coupled to a RNC 1560 which can be coupled to RNC 1550 via a data communication path 1760.

As illustrated, radio network controllers (RNCs) 1550 and 1570 can be coupled to a network 1420 and can be couple to a public switched telephone network (PSTN) 1430. In one or more embodiments, a network 1410 can include one or more of RNCs 1550-1570 and NBs 1240-1270, among others. For example, network 1410 can be and/or implement a telecommunications network. For instance, network 1410 can be and/or implement a wireless telecommunications network that can support one or more wireless telecommunications network protocols such as one or more of General Packet Radio Service (GPRS), enhanced data rates for GSM (global system for mobile communications) evolution (EDGE), long term evolution, (LTE), CDMA (code division multiple access), TDMA (time division multiple access), and FDMA (frequency division multiple access), among others.

In one or more embodiments, network 1410 can be coupled to and/or include a telephony network that can include a wireless cellular telecommunications network and/or a wireless satellite telecommunications network. In one or more embodiments, the telephony network can communicate information such as voice and/or data. In one or more embodiments, network 1410 can implement, provide access to, and/or provide services of one or more other networks. In one example, network 1410 can provide access to and/or services of a public network (e.g., the Internet) to one or more of MDs 1040-1072. In another example, network 1410 can provide access to and/or services of network 1420 and/or a network coupled to network 1420.

As shown, one or more of wireless access points (APs) 1310-1322 can be coupled to network 1420. In one or more embodiments, one or more of wireless APs 1310-1322 can provide one or more alternate data communications paths to one or more of NBs 1240-1270. For example, one or more of wireless APs 1310-1322 can provide wireless data communications of network 1420 to one or more of NBs 1240-1270.

In one or more embodiments, one or more of wireless APs 1310-1314 can be ground-based, and/or one or more of wireless APs 1320-1322 can be non-ground-based. For example, one or more of wireless APs 1320-1322 can be or be included in one or more satellites that orbit a planet (e.g., the planet Earth). In one stance, one or more of the satellites can be in a geosynchronous orbit. In a second instance, one or more of the satellites can be in a lower orbit (e.g., a lower orbit than a geosynchronous orbit). In another instance, one or more of the satellites can be in a higher orbit (e.g., a higher orbit than a geosynchronous orbit).

In one or more embodiments, one or more of MDs 1040-1072 can include multiple mobile devices. For example, each of MDs 1040-1072 can include tens, hundreds, or thousands of mobile devices. In one or more embodiments, demand for an amount of bandwidth by multiple MDs of (e.g., MDs 1040) can exceed an amount of bandwidth that a data communication path (e.g., data communication path 1640) can provide. For example, MDs 1040 can demand an amount of bandwidth to communicate with network 1420 which exceeds an amount of bandwidth that data communication path 1640 can provide. In one or more embodiments, NB 1240 can use one or more alternate data communication paths to provide the amount of bandwidth demanded by MDs 1040. For example, NB 1240 can wirelessly couple to one or more of wireless APs 1311 and 1320-1322, as illustrated in FIG. 2.

Turning now to FIG. 2, one or more of NBs 1240 and 1250 can be coupled to one or more of wireless APs 1310-1314 and 1320-1322, according to one or more embodiments. As shown, NB 1240 can be coupled to one or more of wireless APs 1311 and 1320-1322, and/or NB 1250 can be coupled to one or more of wireless APs 1310 and 1312-1314. In one or more embodiments, NB 1240 and one or more of wireless APs 1311 and 1320-1322 can communicate via one or more respective data communication paths 2311 and 2320-2322, and/or NB 1250 and one or more of wireless APs 1310 and 1312-1314 can communicate via one or more respective data communication paths 2310 and 2312-2314. In one or more embodiments, a NB can include multiple hardware and/or network interfaces that can communicate with multiple devices and/or data communication paths. For example, NB 1240 can include a first interface to communicate with one or more of MDs 1040-1042, a second interface to communicate with data communication path 1640, and one or more interfaces to communicate with one or more of data communication paths 2311 and 2320-2322.

Turning now to FIG. 3, one or more of NBs 1260 and 1270 can be coupled to one or more of wireless APs 1311 and 1320-1322, according to one or more embodiments. As illustrated, NB 1260 can be coupled to one or more of wireless APs 1311 and 1320, and/or NB 1270 can be coupled to one or more of wireless APs 1311, 1321, and 1322. In one or more embodiments, NB 1260 and one or more of wireless APs 1311 and 1320 can communicate via one or more respective data communication paths 3411 and 3320, and/or NB 1270 and one or more of wireless APs 1311, 1321, and 1322 can communicate via one or more respective data communication paths 3411, 3321, and 3322.

Figure 4:
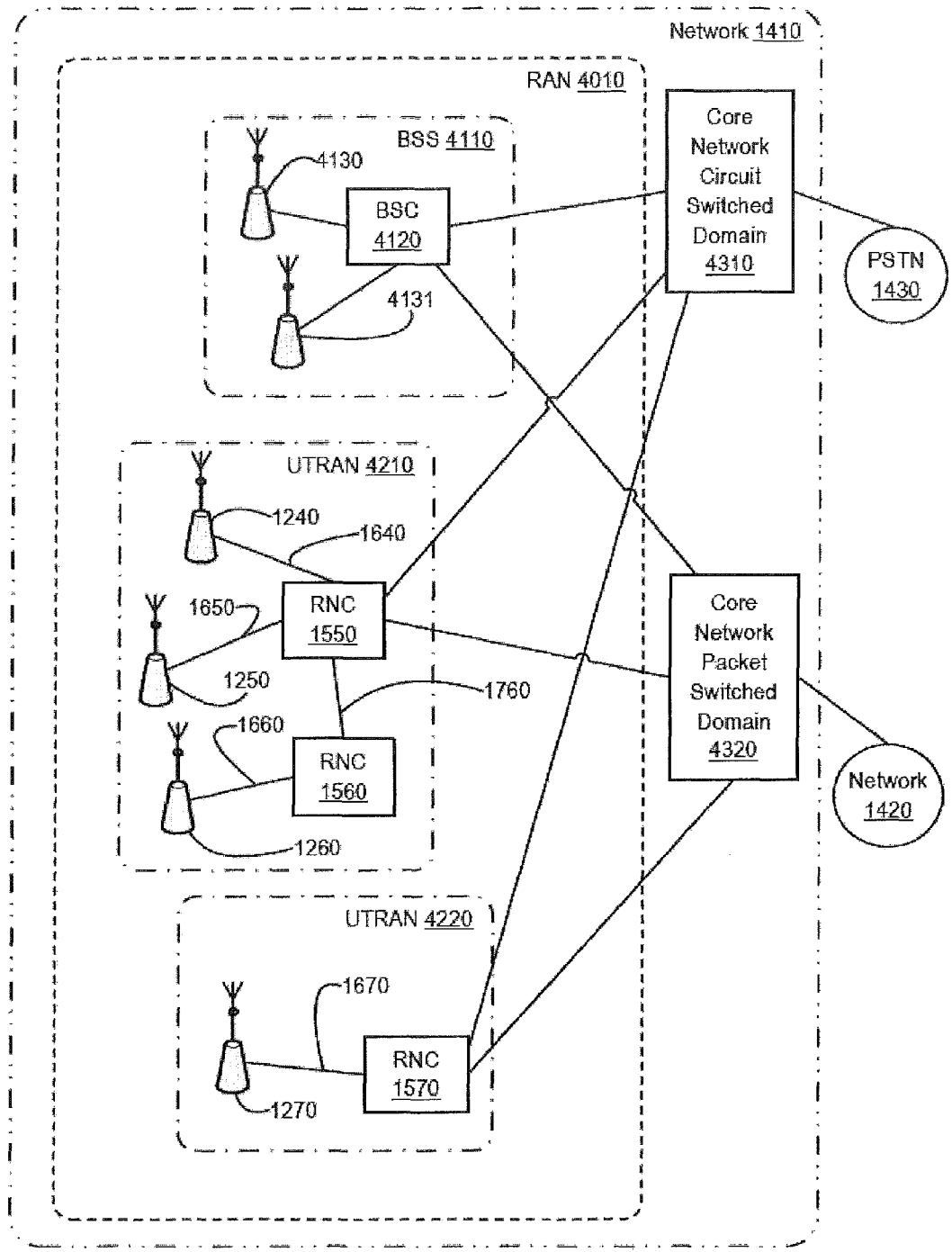
FIG. 4 illustrates a block diagram of one or more network communication systems and a radio access network, according to one or more embodiments.

Turning now to FIG. 4, a block diagram of one or more network communication systems and a radio access network is illustrated, according to one or more embodiments. As shown, network 1410 can include a radio access network (RAN) 4010 that can include a base station subsystem (BSS) 4110. As illustrated, BSS 4110 can include a base station controller (BSC) 4120 and one or more BTSes 4130 and 4131 that can be coupled to BSC 4120. In one or more embodiments, a base transceiver station (BTS) can include one or more transmitters, one or more receivers, one or more transceivers, one or more antennas, and/or one or more cryptography devices that can be used to communicate with one or more MDs 1040-1072 and BSC 4120. For example, the one or more transmitters, the one or more receivers, and/or the one or more transceivers of a BTS can communicate via a layer one of an air interface (e.g., a wireless interface). In one or more embodiments, the one or more antennas of the BTS can be mounted on a roof of a building, on a mast, on a tower (e.g., a cellular telephone communications tower), and/or on a side of a structure (e.g., a building, a parking garage, a lamp post, etc.).

As illustrated, BSC 4120 can be coupled to one or more of a core network circuit switched domain 4310 and a core network packet switched domain 4320. As shown, core network circuit switched domain 4310 and, core network packet switched domain 4320 can be respectively coupled to PSTN 1430 and network 1420. In one or more embodiments, BSC 4120 can communicate telephonic and/or circuit switched data via core network circuit switched domain 4310 to PSTN 1430 and/or packet switched data (e.g., IP (Internet protocol) data) via core network packet switched domain 4320 to network 1420.

As shown, RAN 4010 can include a universal mobile telecommunications system (UMTS) terrestrial radio access network (UTRAN) 4210 and/or a UTRAN 4220. As illustrated, UTRAN 4210 can include one or more RNCs 1550 and 1560, one or more NBs 1240 and 1250 coupled to RNC 1550, and/or NB 1270 coupled to RNC 1570 which can be coupled to RNC 1550. As shown, UTRAN 4220 can include NB 1270 coupled to RNC 1570. In one or more embodiments, a NB can denote include a base transceiver station in a UMTS and can include one or more transmitters, one or more receivers, one or more transceivers, and/or one or more antennas. In one example, a NB can utilize a wideband code division multiple access (WCDMA) and/or a time division synchronous code division multiple access (TD-SCDMA) in implementing an air interface (e.g., wireless interface) with one or more mobile devices. In another example, a NB can be controlled by a RNC (e.g., NB 1640 can be controlled by RNC 1550). In one or more embodiments, the one or more antennas of the NB can be mounted on a roof of a building, on a mast, on a tower (e.g., a cellular telephone communications tower), and/or on a side of a structure (e.g., a building, a parking garage, a lamp post, etc.).

As illustrated, RNC 1550 and/or RNC 1570 can be coupled to can be coupled to one or more of core network circuit switched domain 4310 and core network packet switched domain 4320. In one or more embodiments, RNC 1550 and/or RNC 1570 can communicate telephonic and/or circuit switched data via core network circuit switched domain 4310 to PSTN 1430 and/or packet switched data (e.g., IP data) via core network packet switched domain 4320 to network 1420. In one or more embodiments, RNC 1560 can be coupled to RNC 1550, and RNC 1560 can communicate telephonic and/or or circuit switched data with PSTN 1430 via RNC 1550 and/or packet switched data (e.g., IP data) with network 1420 via RNC 1550. In one or more embodiments, one or more of BSC 4120, BTSes 4130 and 4131, RNCs 1550-15570, and NBs 1240-1270 can include one or more computer systems that can implement one or more systems and/or methods described herein.

In one or more embodiments, network 1420 can provide access and/or services of one or more other networks to NBs 1240-1270 via one or more wireless APs 1310-1322. In one or more embodiments, access to these networks can include one or more "services" these networks may provide. For example, these one or more services can include one or more of: email, world wide web, file transfer, printing, file sharing, file system sharing, remote file system, network file system (NFS), news, multicast, netbios, encryption, domain name service (DNS), routing, tunneling, chat such as Internet Remote Chat and/or AOL Instant Messenger, gaming, licensing, license management, digital rights management, network time, remote desktop, remote windowing, audio, database (e.g., Oracle, Microsoft SQL Server, PostgreSQL, etc.), authentication, accounting, authorization, virtual local area network (VLAN) (e.g., IEEE 802.1q), virtual private network or VPN, audio, phone, Voice Over Internet Protocol (VoIP), paging, and video, among others. In one or more embodiments, the one or more service can be associated with and/or correspond to one or more protocols of one or more computer and/or software applications.

In one or more embodiments, a wireless AP can provide authentication, quality of service (QoS), communication traffic shaping, and/or access control from one or more devices coupled to the wireless AP. For example, wireless AP 1310 can include an access control list that can be modifiable, and wireless AP 1310 can use the access control list to permit and/or deny access of one or more devices (e.g., NBs 1240-1270) to network 1420. In one or more embodiments, wireless AP 1210 can perform one or more processes and/or methods that can modify the access control list. In one or more embodiments, wireless AP 1310 can receive one or more signals from a remote signaling device, and the access control list of wireless AP 1310 can be modified based on the received one or more signals from the remote signaling device. In one or more embodiments, signals and/or signaling can be used in communicating establishment and/or control of communications and/or access to a network and/or resources of the network. In one or more embodiments, signals and/or signaling can be used between two different network providers or between two systems of a single network provider. In one example, a first network provider can be or include a second network provider, and signals and/or signaling can be used between the first network provider and the second network provider can mean signaling between two systems of the first network provider. In one or more embodiments, signals and/or signaling can be used to convey information (e.g., configuration messages, accounting messages, network management data, control data, etc.) that is different than user information transfer (e.g., a telephone conversation between two users, a text message communication between two users, etc.).

In one or more embodiments, network 1410 and/or network 1420 can include a wired network, a wireless network or a combination of wired and wireless networks. Network 1410 and/or network 1420 can include and/or be coupled to various types of communications networks, such as a PSTN, an Internet, a wide area network (WAN) (e.g., a private WAN, a corporate WAN, a public WAN, etc.), a local area network (LAN), etc. In one or more embodiments, a wireless AP can be coupled to network 1420, e.g., via: Ethernet cable and DSL; a cable (television) based network; a satellite-based system; and/or a fiber based network; among others. In one or more embodiments, network 1410 and/or network 1420 can include one or more wireless networks, e.g., based on IEEE (Institute of Electrical and Electronics Engineers) 802.11 and/or IEEE 802.16, among others. For instance, one or more of wireless APs 1310-1322 can be coupled to network 1420 in a wireless fashion.

In one or more embodiments, network 1410 and/or network 1420 can include one or more DSL (digital subscriber line) and/or cable (e.g., cable television) networks and/or infrastructures. For example, network 1410 and/or network 1420 can include one or more of: cable modems, cable modem termination systems (CMTSs), satellite modems, DSL modems, digital subscriber line access multiplexers (DSLAMs), broadband remote access servers (BRASs), telecommunications circuits, and/or metropolitan area networks (MANs), among others. In one or more embodiments, network 1420 may form part of the Internet, or may couple to other networks, e.g., other local or wide area networks such as the Internet. In one or more embodiments, a wireless AP can be a system operable to be coupled to and/or include networking equipment usable to couple the wireless AP to network 1420. In one example, wireless AP 1310 can include a wired Ethernet interface that can be coupled to a cable modem or a DSL modem that can be coupled to network 1420. In another example, wireless AP 1310 can include a FDDI (fiber distributed data interface) that can be coupled to a router and/or gateway device that can be coupled to network 1420.

In one or more embodiments, each NB of NBs 1240-1270 can include and/or can be coupled to one or more transceivers that allow the NB to communicate with network 1420 and/or a wireless AP of wireless APs 1310-1322. For example, NB 1240 can include or be coupled to a first transceiver that can communicate with MDs 1040-1042 and/or include or be coupled to a second transceiver to communicate with one or more of wireless APs 1311 and 1320-1322. For instance, NB 1240 can include or be coupled to the second transceiver (e.g., a wireless Ethernet transceiver, a WiMax transceiver, a satellite communications transceiver, etc.) to communicate with one or more of wireless APs 1311 and 1320-1322. In one or more embodiments, a NB can use the second transceiver in communicating using one or more alternate data communication paths to provide additional bandwidth, different QoS, and/or further QoS to one or more MDs.

In one or more embodiments, the second transceiver can communicate with one or more wireless APs using one or more of IEEE 802.16, WiMax, IEEE 802.11, WiFi (e.g., wireless Ethernet), and satellite communications technologies, among others. In one or more embodiments, the second transceiver can communicate with one or more wireless APs using one or more ISM (industrial, scientific and medical) bands. For example, an ISM band can include a frequency range of 6.765-6.795 Mhz, 433.05-434.79 Mhz, 902-928 Mhz, 2.4-2.5 Ghz, 5.725-5.875 Ghz, or 24.0-24.25 Ghz, among others. In one or more embodiments, the second transceiver can communicate with one or more wireless APs using a satellite communications band. For example, a satellite communications band can include a Ka band that can include a frequency range of 18.3-31 GHz. In one instance, a satellite uplink can include frequency range of 27.5-31 GHz, among others. In another instance, a satellite downlink can include frequency range of 18.3-20.2 GHz, among others.

Figure 5:
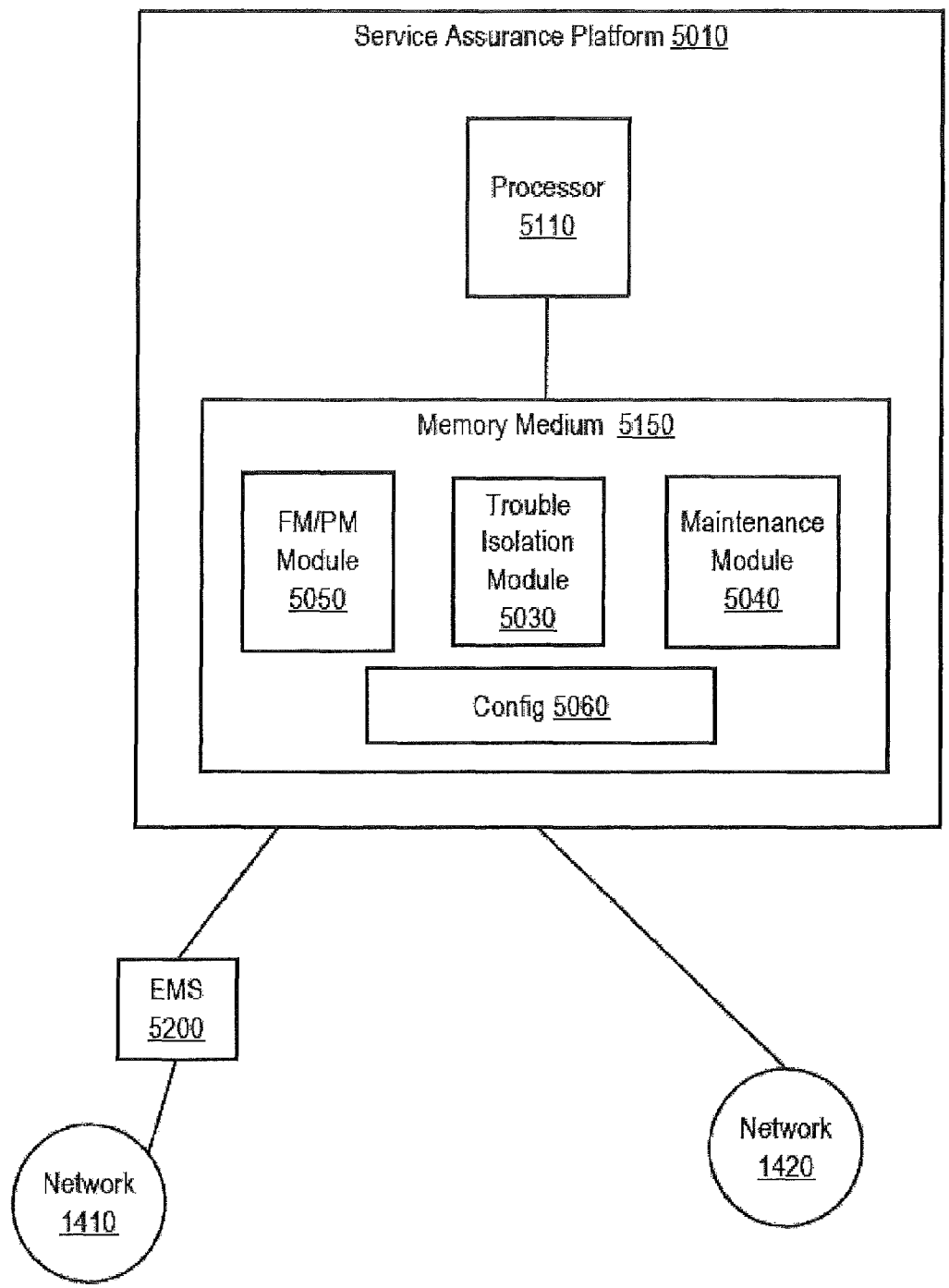
FIG. 5 illustrates a block diagram of a service assurance platform, according to one or more embodiments.

Turning now to FIG. 5, a block diagram of a service assurance platform is illustrated, according to one or more embodiments. As shown, a service assurance platform (SAP) 5010 can include one or more modules, such as one or more of a FM/PM (fault management/performance management) module 5050, a trouble isolation module 5030, and a maintenance module 5040, among others. In one or more embodiments, SAP 5010 can be coupled to network 1420. In one or more embodiments, SAP 5010 can be coupled to network 1410. For example, SAP 5010 can be coupled to network 1410 via an element management system (EMS) 5200. In one or more embodiments, EMS 5200 can aggregate and/or collect multiple messages (e.g., network management data and/or messages, fault messages, network request messages, network allocation messages, etc.) for SAP 5010. For example, SAP 5010 can receive messages associated with signaling information associated with capacity request and/or capacity allocation messages.

In one or more embodiments, high speed dedicated shared channel framework protocol (HS-DSCH FP) data associated with RAN 4010 can be collected and/or received by SAP 5010, and SAP 5010 can analyze the HS-DSCH FP data to determine whether or not one or more faults that may cause the network capacity or the capacity being exceeded due to dynamic and/or unexpected traffic of RAN 4010. For example, the HS-DSCH FP data can include multiple signaling messages that can include multiple HS-DSCH FP signaling transactions.

In one or more embodiments, SAP 5010 can include a computer system and modules 5030-5050 can be included in a memory medium of the computer system and executed by a processor of the computer system. As illustrated, SAP 5010 can include a processor 5110 and a memory medium 5150 coupled to processor 5110, and memory medium 5150 can include modules 5030-5050 and configuration 5060. In one or more embodiments, SAP 5010 can include multiple computer systems and modules 5030-5050 can be distributed between or among the computer systems. For example, one or more of modules 5030-5050 can be included in a memory of a first computer system and executed by a processor of the first computer system, and the other module(s) 5050-5040 can be included in a memory of a second computer system and executed by a processor of the second computer system.

In one or more embodiments, fault management can include monitoring and/or determining of one or more hardware faults, and/or performance management can include monitoring and/or determining of one or more of packet loss, packet jitter, packet delay, and packet latency, among others. In one or more embodiments, FM/PM module 5050 can determine whether or not a hardware fault and/or a performance fault is an issue (e.g., a problem) with one or more devices and/or wireless communications at one or more locations or coverage areas. For example, FM/PM module 5050 can receive one or more messages from one or more of networks 1410 and 1420 and can determine whether or not a hardware fault and/or a performance fault is an issue (e.g., a problem) with communications via one or more NBs 1240-1270.

In one or more embodiments, trouble isolation module 5030 can determine that a bandwidth demand is and/or is associated with an issue (e.g., a problem). For example, trouble isolation module 5030 can determine that a bandwidth demand from MDs 1040 exceeds a bandwidth capacity of data communication path 1640. In one or more embodiments, trouble isolation module 5030 can include and/or utilize configuration 5060 and/or rules that can be included in configuration 5060 in determining that a bandwidth demand is and/or is associated with an issue.

In one example, configuration 5060 can include one or more rules and/or configurations that can provide information to trouble isolation module 5030 regarding the bandwidth capacity of data communication path 1640. For instance, configuration 5060 can include one or more rules and/or configurations associated with one or more of network topology and routing, among others, of data communication path 1640, and trouble isolation module 5030 can utilize the one or more rules and/or configurations of data communication path 1640. In one or more embodiments, trouble isolation module 5030 can interact with one or more devices to determine one or more issues. In one example, trouble isolation module 5030 can interact with one or more of devices, that are included in and/or implement data communication path 1640, to determine one or more issues. For instance, trouble isolation module 5030 can interact with one or more devices, such as one or more network elements of network 1410 and/or one or more network elements and/or devices that are used to implement data communication path 1640 to determine one or more issues.

In one or more embodiments, maintenance module 5040 can include and/or utilize one or more configurations and/or rules (e.g., rules included in configuration 5060) to address an issue (e.g., a problem). In one or more embodiments, maintenance module 5040 can determine one or more actions that can be taken to resolve an issue. In one or more embodiments, resolving an issue can include one or more of addressing and/or correcting the issue. In one example, maintenance module 5040 can signal one or more of RNC 1550 and NB 1240 to establish an alternate data communication path with one or more of wireless APs 1311 and 1320-1322. In another example, maintenance module 5040 can signal one or more of RNC 1550 and NB 1250 to establish an alternate data communication path with one or more of wireless APs 1310 and 1312-1314.

In one or more embodiments, maintenance module 5040 can issue a maintenance request for one or more service personnel to address an issue. In one instance, the one or more service personnel can address one or more issues that may not be able to be addressed and/or corrected by maintenance module 5040. In another instance, the one or more service personnel can be dispatched to physically inspect, repair, and/or replace one or more devices included in and/or implementing network 1410. In a second example, maintenance module 5040 can send, provide, and/or issue one or more messages that can resolve an issue. For instance, maintenance module 5040 can send, provide, and/or issue one or more messages that can change and/or augment a routing path (e.g., a routing path that utilizes one or more network elements of network 1410 and/or one or more network elements and/or devices that are used to provide data communication paths of one or more NBs 1240-1270). In one or more embodiments, one or more of RNCs 1550-1570 and/or one or more of NBs 1240-1270 can include same or similar one or more structures and/or same or similar one or more functionalities described with reference to SAP 5010.

Figure 6:
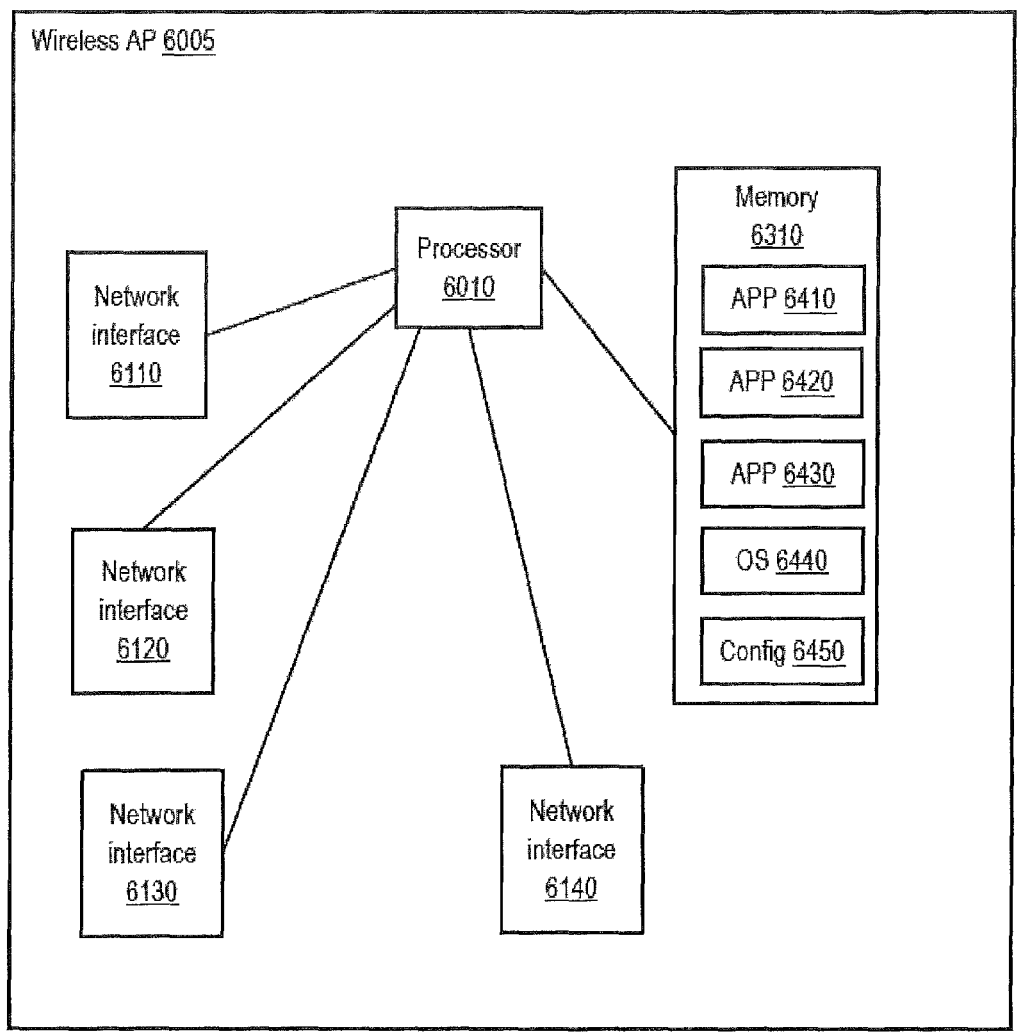
FIG. 6 illustrates a block diagram of a wireless access point, according to one or more embodiments.

Turning now to FIG. 6, a block diagram of a wireless access point is illustrated, according to one or more embodiments. As shown, a wireless AP 6005 can include a memory medium 6310 coupled to a processor 6010, and wireless AP 6005 can include one or more network interfaces 6110-6140 coupled to processor 6010. In one or more embodiments, a network interface (e.g., a network interface from network interfaces 6110-6140) can be coupled to network 1420. In one example, network interface 6110 can implement an Ethernet interface that is operable to be coupled to a cable modem, a router, or a DSL modem, among others, where the cable modem, the router, or the DSL modem is operable to be coupled to network 1420. In another example, network interface 6110 can implement a WiMax network interface that is operable to be coupled to a WiMax access point that is operable to be coupled to network 1420.

In one or more embodiments, a network interface (e.g., a network interface from network interfaces 6110-6140) can be coupled to one or more devices (e.g., one or more of NBs 1240-1270, etc.), in a wireless fashion. In one example, network interface 6120 can implement an IEEE 802.11 interface that can wirelessly communicate with one or more NBs 1240-1270. In a second example, network interface 6130 can implement an IEEE 802.16 interface that can wireless communicate with one or more NBs 1240-1270. In another example, network interface 6140 can implement a satellite communications interface that can communicate with one or more NBs 1240-1270.

As shown, memory medium 6310 can include one or more APPs 6410-6430, an OS 6440, and/or a configuration 6450. In one or more embodiments, one or more of APPs 6410-6430 and/or OS 6440 can be executable by processor 6010 to implement one or more systems, processes, and/or methods described herein. In one or more embodiments, configuration 6450 can include network information associated with network elements and/or devices coupled to wireless AP 6005. In one example, the network information can include one or more rules associated with communicating information with one or more of SAP 5010, RNCs 1550-1570, and NBs 1240-1270. In another example, the network information can include one or more rules associated with interacting with one or more of SAP 5010, RNCs 1550-1570, and NBs 1240-1270. In one or more embodiments, one or more of wireless APs 1310-1322 can include same or similar structures and/or functionalities of those described with reference to wireless AP 6005.

Figure 7:
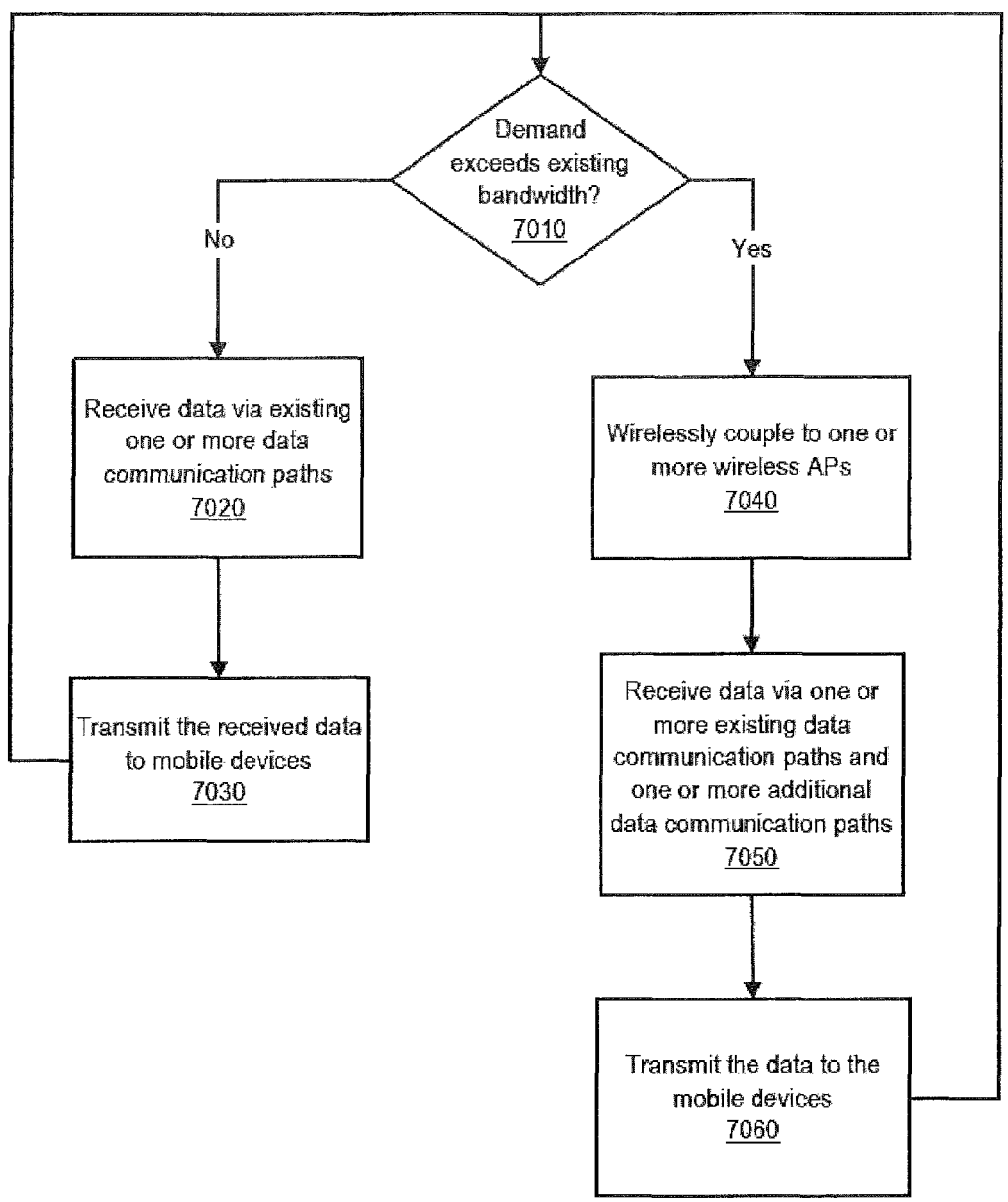
FIG. 7 illustrates a method to determine demand and establish one or more data communication paths, according to one or more embodiments.

Turning now to FIG. 7, a method to determine demand and establish one or more data communication paths is illustrated, according to one or more embodiments. At 7010, it can be determined whether or not demand exceeds existing bandwidth of one or more data communication paths. In one example, SAP 5010 can determined whether or not demand exceeds existing bandwidth of a first data communication path (e.g., data communication path 1640). In a second example, SAP 5010 can determined whether or not demand exceeds existing bandwidth of multiple data communication paths (e.g., data communication path 1640 and one or more of data communication paths 2311 and 2320-2322).

In one or more embodiments, the demand can be from one or more MDs. For example, the demand can be from one or more of MDs 1040-1042. In one or more embodiments, the demand that exceeds the existing bandwidth of the one or more data communication paths can be caused by an issue determined by SAP 5010. For example, the one or more data communication paths can include data communication path 1640 which can include one or more communication circuits (e.g., one or more T1s, E1s, T3s, etc.), and trouble isolation module 5030 can determine that an issue exists with the one or more communication circuits which causes the demand to exceed the existing bandwidth of data communication path 1640. For instance, trouble isolation module 5030 can determine that a bandwidth demand from MDs 1040 exceed a bandwidth capacity of data communication path 1640 due to one or more issues.

If the demand does not exceed the existing bandwidth of the one or more data communication paths, the method can proceed to 7020 where data can be received via the existing one or more data communication paths. In one example, the data can be received via data communication path 1640. In another example, the data can be received via data communication path 1640 and at least one of data communication paths 2311 and 2320-2322. At 7030, the data can be transmitted to the mobile devices. For example, NB 1240 can transmit the data to one or more of MDs 1040-1042. In one or more embodiments, the method can proceed to 7010.

If the demand exceeds the existing bandwidth of the one or more data communication paths, the method can proceed to 7040 where a NB can wirelessly couple to one or more wireless APs. In one example, NB 1240 can wirelessly couple to one or more of wireless APs 1311 and 1320-1322. In one or more embodiments, NB 1240 wirelessly coupling to one or more of wireless APs 1311 and 1320-1322 can establish one or more of data communication paths 2311 and 2320-2322, respectively. In one or more embodiments, establishing one or more of data communication paths 2311 and 2320-2322 can include wireless coupling to one or more of data communication paths 2311 and 2320-2322, respectively. For example, SAP 5010 can signal RNC 1550 and/or NB 1240 to establish one or more of data communication paths 2311 and 2320-2322. For instance, maintenance module 5040 can signal RNC 1550 and/or NB 1240 to establish one or more of data communication paths 2311 and 2320-2322.

At 7050, data can be received via the existing one or more data communication paths and the one or more additional data communication paths. For example, the data can be received via data communication path 1640 and one or more of data communication paths 2311 and 2320-2322. At 7060, the data can be transmitted to the mobile devices. For example, NB 1240 can transmit the data to one or more of MDs 1040-1042. For instance, NB 1240 can transmit the data to one or more of MDs 1040-1042 via a high speed downlink packet access (HSDPA) protocol and/or a high speed dedicated shared channel framework protocol (HS-DSCH FP). In one or more embodiments, the method can proceed to 7010.

Figure 8:
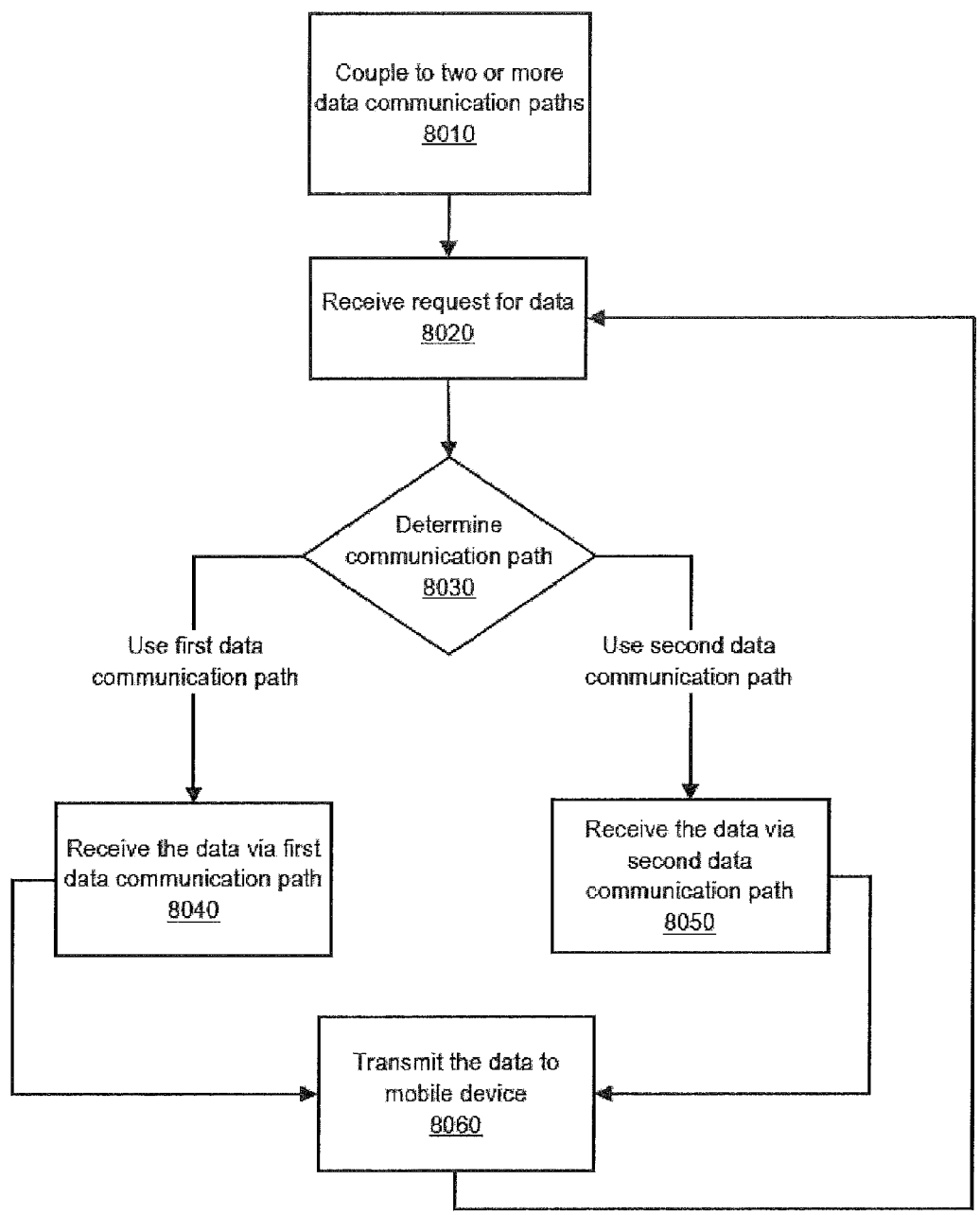
FIG. 8 illustrates a method to determine use of two or more data communication paths, according to one or more embodiments.

Turning now to FIG. 8, a method to determine use of two or more data communication paths is illustrated, according to one or more embodiments. At 8010, a NB can couple to two or more data communication paths. For example, NB 1240 can couple to data communication path 1640 and to one or more of data communication paths 2311 and 2320-2322. At 8020, a request for data can be received. For example, NB 1240 and/or RNC 1550 can receive a request for data from a mobile device of MDs 1040-1042.

At 8030, a data communication path of the two or more data communication paths can be determined. In one or more embodiments, at least two of the two or more data communication paths can include two different respective qualities of service. In one example, a first data communication path (e.g., data communication path 1640) can include a first latency and a second data communication path (e.g., a data communication path of data communication paths 2311 and 2320-2322) can include a second, different, latency. For instance, the first latency can be a lower than the second latency. In another example, the first data communication path can include a first bandwidth and the second data communication path can include a second, different, bandwidth. For instance, the first bandwidth can be a higher bandwidth than the second bandwidth.

In one or more embodiments, the requested data can be associated with a service and/or application that can favor and/or require a lower latency. For example, the requested data associated with one or more of services and/or applications such as one or more of conferencing (e.g., audio and/or video conferencing), video games, telnet, network time, remote desktop, remote windowing, accounting, and VoIP, among others, can favor and/or require a lower latency. In one or more embodiments, the requested data can be associated with a service and/or application that may not favor and/or require a lower latency. For example, the requested data can be associated with one or more of services and/or applications such as one or more of email, world wide web, file transfer, printing, DNS, tunneling, chat such as Internet Remote Chat and/or AOL Instant Messenger, authentication, authorization, VPN, streaming audio download, paging, and streaming video download, among others, may not favor and/or require a lower latency.

In one or more embodiments, determining the data communication path of the two or more data communication paths can be based on a latency favor and/or requirement associated with the requested data. In one or more embodiments, determining the data communication path of the two or more data communication paths can be based on a QoS profile. For example, a subscriber associated with the mobile device can be associated with a subscriber profile that can include a QoS profile. For instance, the QoS profile can include a minimum QoS. In one or more embodiments, the QoS profile can be used to prioritize data trafficking and/or routing of the two or more data communication paths. In one example, a first request for data of a first mobile device associated with the minimum QoS can be serviced via the first data communication path while a second request for data of a second mobile device not associated with the minimum QoS can be serviced via the second data communication path. In another example, a first request for data of a first mobile device associated with a first QoS profile can be serviced via the first data communication path while a second request for data of a second mobile device associated with a second, different, QoS profile can be serviced via the second data communication path.

If a first data communication path of the two or more data communication paths is determined, the method can proceed to 8040 where the requested data can be received via the first data communication path. For example, the first data communication path can include data communication path 1640. If a second data communication path of the two or more data communication paths is determined, the method can proceed to 8050 where the requested data can be received via the second data communication path. For example, the second data communication path can include data communication path 2320. At 8060, the received data can be transmitted to the mobile device via a NB. For example, NB 1240 can transmit the received data to the mobile device. For instance, NB 1240 can transmit the received data to the mobile device via a HSDPA protocol and/or a HS-DSCH FP.

Figure 9:
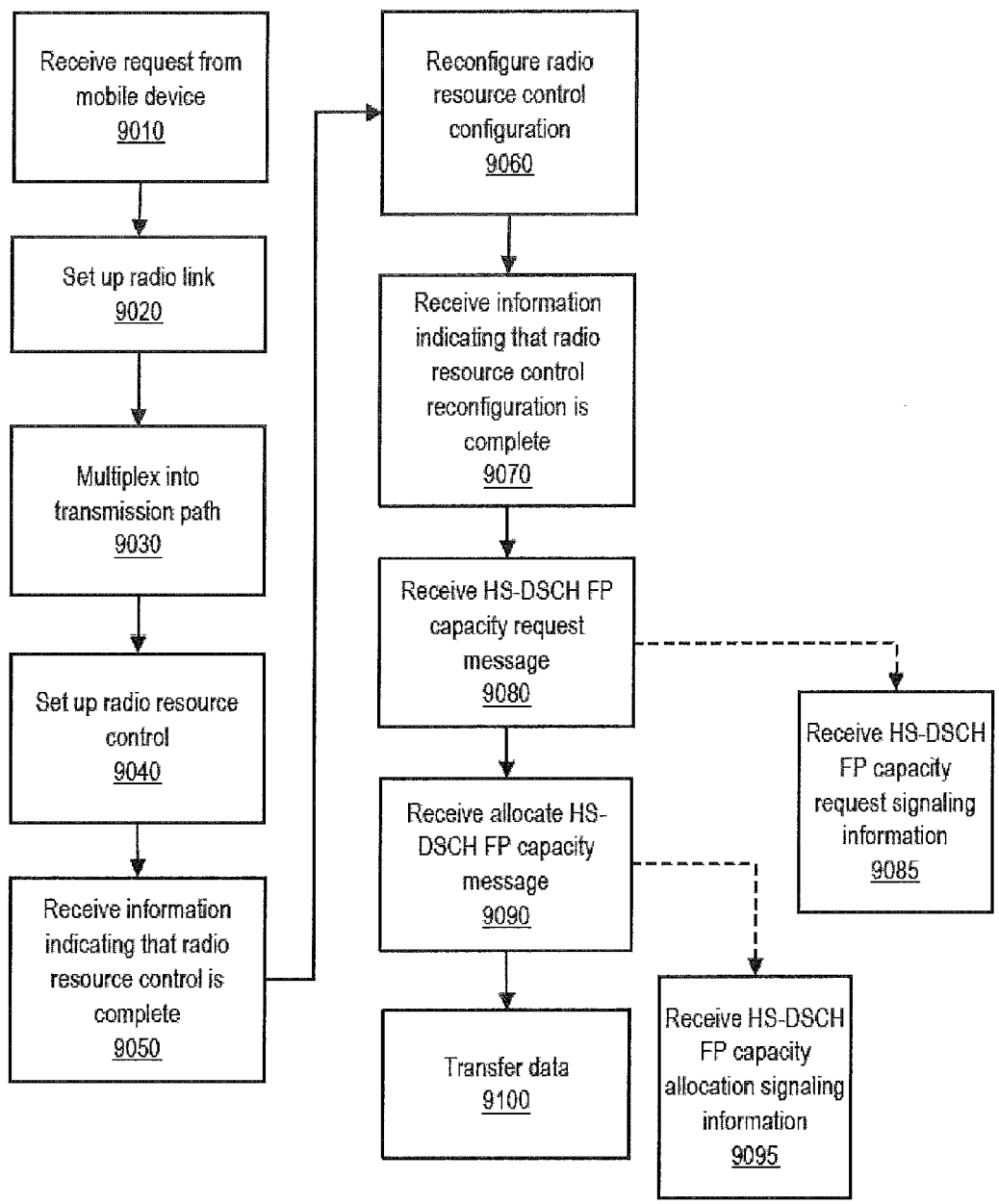
FIG. 9 illustrates a method of operating a radio access network and a service assurance platform, according to one or more embodiments.

Turning now to FIG. 9, a method of operating a radio access network and a service assurance platform is illustrated, according to one or more embodiments. At 9010, a connection request from a mobile device can be received. For example, NB 1240 can receive a connection request from a MD of MDs 1040-1042. At 9020, a radio link between the mobile device and a NB can be set up. For example, a radio link between a MD of MDs 1040-1042 and NB 1240 can be set up. In one or more embodiments, a RNC can control setting up the link between the MD and the NB by controlling the NB via signaling protocol. For example, RNC 1550 can control NB 1240 via a Node B Application Part (NBAP) protocol. In one or more embodiments, NBAP can form part of an Iub interface between a RNC and a NB.

At 9030, the radio link associated with the mobile device can be multiplexed into a transmission path. In one or more embodiments, an Access Link Control Application Part (AL-CAP) can multiplex multiple channels used by multiple MDs into one transmission path. At 9040, radio resource control (RRC) can be set up by the RNC. At 9050, the RNC can receive information from the MD indicating that the RRC set up is complete. At 9060, the RNC can reconfigure the RRC configuration. At 9070, the RNC can receive information from the MD indicating that the RRC reconfiguration is complete.

At 9080, the NB can receive a HS-DSCH FP capacity request message. For example, NB 1240 can receive HS-DSCH FP capacity request message from RNC 1550. For instance, the HS-DSCH FP capacity request message can indicate that data is ready for transmission to the NB. At 9090, the RNC can receive a capacity request message from the NB. At 9100, the RNC can transfer data to the NB. For example, RNC 1550 can transfer data to NB 1240 via data communication path 1640.

In one or more embodiments, SAP 5010 can receive signaling information associated with capacity request and/or capacity allocation messages. As illustrated, SAP 5010 can receive capacity request signaling information associated with the capacity request messages at 9085, and SAP 5010 can receive capacity allocation messages at 9095. In one example, the capacity request signaling information can include a number of MAC-d PDUs that can be transmitted to the RNC in an amount of time. In one or more embodiments, SAP 5010 can utilize the capacity request signaling information and/or other RAN QoS measurements (e.g., current traffic load of the RNC, handoff call data, etc.) in evaluating and/or determining availability and/or capacity of a data communication path coupling the RNC and the NB. For example, SAP 5010 can, based on the capacity request signaling information and/or other RAN QoS measurements, signal information to the RNC and/or the NB that the NB is to wirelessly couple to at least a second data communication path and utilize the second data communication path in communicating with the MDs coupled to the NB.

In one or more embodiments, the term "memory" can mean a "memory medium" and/or "computer readable memory medium" which is intended to include various types of memory or storage, including an installation medium, e.g., a CD-ROM, or floppy disks, a random access memory or computer system memory such as DRAM, SRAM, EDO RAM, Rambus RAM, NVRAM, EPROM, EEPROM, flash memory etc., and/or a non-volatile memory such as a magnetic media, e.g., a hard drive, and/or optical storage.

In addition, the memory medium can be located in a first computer in which the programs are executed, or can be located in a second different computer and/or hardware memory device that connects to the first computer over a network. In one or more embodiments, the second computer provides the program instructions to the first computer for execution. The memory medium can also be a distributed memory medium, e.g., for security reasons, where a portion of the data is stored on one memory medium and the remaining portion of the data can be stored on a different memory medium. Also, the memory medium can include one of the networks to which the current network is coupled, e.g., a SAN (Storage Area Network).

In one or more embodiments, each of the systems described herein may take various forms, including a personal computer system, server computer system, workstation, network appliance, Internet appliance, wearable computing device, personal digital assistant (PDA), tablet computing device, laptop, mobile telephone, mobile multimedia device, embedded computer system, television system, and/or other device. For example a MD of MDs 1040-1072 may take various forms, including a portable computer system, wearable computing device, PDA, smart phone, tablet computing device, laptop, mobile telephone, mobile multimedia device, embedded computer system, and/or other portable device. In general, the terms "computing device", "computer", and/or "computer system" can be broadly defined to encompass any device having a processor which executes instructions from a memory medium.

It is noted that, in one or more embodiments, one or more of the method elements described herein and/or one or more portions of an implementation of a method element can be performed in varying orders, can be repeated, can be performed concurrently with one or more of the other method elements and/or one or more portions of an implementation of a method element, or can be omitted. Additional and/or duplicated method elements can be performed as desired. For example, a process and/or method can perform one or more described method elements concurrently with duplicates of the one or more described method elements. For instance, multiple methods, processes, and/or threads can be implemented using same described method elements. In one example, one or more of RNC 1550, SAP 5010, and NB 1240 can concurrently implement some or all method elements of FIGS. 7-9 for use with two or more of MDs 1040-1042 and/or two or more of wireless APs 1311 and 1320-1322. In one or more embodiments, one or more of the method illustrated in FIGS. 7-9 can be repeated.

In one or more embodiments, concurrently can mean simultaneously. In one or more embodiments, concurrently can mean apparently simultaneously according to some metric. For example, two or more method elements and/or two or more portions of an implementation of a method element can be performed such that they appear to be simultaneous to a human. It is also noted that, in one or more embodiments, one or more of the system elements described herein may be omitted and additional system elements can be added as desired.

Further modifications and alternative embodiments of various aspects of the disclosure may be apparent to those skilled in the art in view of this description. Accordingly, this description is to be construed as illustrative only and is for the purpose of teaching those skilled in the art the general manner of carrying out embodiments of the disclosure. It is to be understood that the descriptions and the diagrams shown herein are to be taken as embodiments. Elements and materials may be substituted for those illustrated and described herein, parts and processes may be reversed, and certain features in the disclosure may be utilized independently, all as would be apparent to one skilled in the art after having the benefit of the description in the disclosure. Changes may be made in the elements described herein without departing from the scope of the disclosure as described in the following claims.

What is claimed is:

1. A method comprising:
   in response to determining at a base station that a first data communication measure for a first data communication path between the base station, which is configured to provide wireless communication services to a plurality of communication devices, and a network, which provides data to the plurality of communication devices, fails to satisfy a first threshold:
      establishing, at the base station, a second data communication path between the base station and the network via a wireless access point based on an access control list; and
      receiving, at the base station, a first data portion from the network via the second data communication path and a second data portion from the network via the first data communication path, wherein receipt of the first data portion satisfies a second data threshold of the second data communication path, wherein receipt of the second data portion satisfies the first threshold, and wherein the first data portion, the second data portion, or a combination thereof includes the data.

2. The method of claim 1, wherein the data communication measure includes a measure of bandwidth demand, wherein the first threshold is a first bandwidth threshold, and wherein the second threshold is a second bandwidth threshold that is less than the first bandwidth threshold.

3. The method of claim 1, wherein the base station is concurrently connected to the first data communication path and the second data communication path.

4. The method of claim 1, wherein the first data communication path includes a wired portion between the base station and a radio network controller.

5. The method of claim 1, wherein the second data communication path is established when information identifying the base station is included in the access control list, and wherein the access control list is stored at the wireless access point.

6. The method of claim 1, wherein the wireless access point is not located on a ground of a planet.

7. The method of claim 1, wherein the second data communication path is established based on determining whether information identifying the base station is included in the access control list.

8. The method of claim 1, wherein the access control list includes information indicating a particular base station permitted to access the network via the wireless access point.

9. The method of claim 1, wherein the access control list is determined based on access information received from a remote computing device associated with the network.

10. The method of claim 1, further comprising receiving signaling information from a computing device associated with the network, wherein the signaling information indicates a status of the first data communication path, and wherein the base station determines whether the data communication measure fails to satisfy the first threshold based on the signaling information.

11. The method of claim 1, further comprising, in response to determining that receipt of the first data portion will satisfy the second threshold and that receipt of the second data portion will fail to satisfy the first threshold:
   establishing, at the base station, a third data communication path between the base station and the network via a second wireless access point based on a second access control list; and
   receiving, at the base station, a third data portion from the network via the third data communication path and a fourth data portion from the network via the first data communication path, wherein receipt of the third data portion satisfies a third threshold of the third data communication path, wherein the fourth data portion satisfies the first threshold, and wherein a combination of the first data portion, the third data portion, and the fourth data portion includes the data.

12. The method of claim 11, wherein the second wireless access point is not located on a ground of a planet and the wireless access point is located on the ground of the planet.

13. A system comprising:
   a processor; and
   a memory accessible to the processor, the memory including processor-executable instructions that are executable by the processor to perform operations comprising:
      in response to determining that a first data communication measure for a first data communication path between a base station, which is configured to provide wireless communication services to a plurality of communication devices, and a network, which provides data to the plurality of communication devices, fails to satisfy a first threshold:
         establishing a second data communication path between the base station and the network via a wireless access point based on an access control list; and
         receiving a first data portion from the network via the second data communication path and a second data portion from the network via the first data communication path, wherein receipt of the first data portion satisfies a second threshold of the second data communication path, wherein receipt of the second data portion satisfies the first threshold, and wherein the first data portion, the second data portion, or a combination thereof includes the data.

14. The system of claim 13, wherein the network includes a digital subscriber line network, a digital subscriber line modem, a digital subscriber line access multiplexer, or a combination thereof.

15. The system of claim 13, wherein the base station receives information from a computing device coupled to the network, the information indicating whether the data communication measure fails to satisfy the first threshold.

16. The system of claim 15, wherein the information is based on a capacity request message, a capacity allocation message, or both.

17. The system of claim 13, wherein the network includes a telecommunications network.

18. The system of claim 13, wherein the operations further comprise:
    determining a first portion of the data to be received via the first data communication path, the second data communication path, or both, wherein the first portion is determined based on a first performance profile associated with a first communication device of the plurality of communication devices; and
    determining a second portion of the data to be received via the first data communication path, the second data communication path, or both, wherein the second portion is determined based on a second performance profile associated with a second communication device of the plurality of communication devices.

19. A computer-readable memory device comprising processor-executable instructions that are executable by a processor to perform operations comprising:
    in response to determining that a first data communication measure for a first data communication path between a base station, which is configured to provide wireless communication services to a plurality of communication devices and a network, which provides data to the plurality of communication devices, fails to satisfy a first threshold:
        establishing a second data communication path between the base station and the network via a wireless access point based on an access control list; and
        receiving a first data portion from the network via the second data communication path and a second data portion from the network via the first data communication path, wherein receipt of the first data portion satisfies a second threshold of the second data communication path, wherein receipt of the second data portion satisfies the first threshold, and wherein the first data portion, the second data portion, or a combination thereof includes the data.

20. The computer-readable memory device of claim 19, wherein the access control list includes information indicating a particular base station that is prohibited from accessing the network via the wireless access point.

* * * * *